(12) United States Patent
Chen (10) Patent No.: US 11,216,003 B2
(45) Date of Patent: Jan. 4, 2022

(54) NAVIGATION SYSTEM FOR MATERIAL STORAGE SYSTEM AND NAVIGATION METHOD FOR MATERIAL TRANSPORTER

(71) Applicants: Inventec (Pudong) Technology Corporation, Shanghai (CN); INVENTEC CORPORATION, Taipei (TW)

(72) Inventor: Po-Jui Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 263 days.

(21) Appl. No.: 16/547,766

(22) Filed: Aug. 22, 2019

(65) Prior Publication Data

US 2020/0393834 A1 Dec. 17, 2020

(30) Foreign Application Priority Data

Jun. 12, 2019 (CN) .......................... 201910506745.8

(51) Int. Cl.
*G05D 1/02* (2020.01)
*G05D 1/00* (2006.01)

(52) U.S. Cl.
CPC .......... *G05D 1/024* (2013.01); *G05D 1/0027* (2013.01); *G05D 1/0212* (2013.01); *G05D 2201/0216* (2013.01)

(58) Field of Classification Search
CPC .... G05D 1/024; G05D 1/0027; G05D 1/0212; G05D 2201/0216
See application file for complete search history.

(56) References Cited

U.S. PATENT DOCUMENTS

| | | | |
|---|---|---|---|
| 2016/0368143 A1* | 12/2016 | Tang | G05B 19/00 |
| 2018/0039282 A1* | 2/2018 | Gupta | G06Q 10/0833 |
| 2018/0217605 A1* | 8/2018 | Osaka | G05D 1/0219 |

* cited by examiner

*Primary Examiner* — Adam R Mott
(74) *Attorney, Agent, or Firm* — Locke Lord LLP; Tim Tingkang Xia, Esq.

(57) ABSTRACT

A navigation system adapted for a material storage system, which comprises a monitoring device and a material transporter. The monitoring device generates an order instruction including a first coordinate and a second coordinate, and generates a movement instruction based on the first coordinate and a current coordinate of the material transporter. The material transporter receives the order instruction and the movement instruction, and the material transporter generates and sends the current displacement data to the monitoring device. The material transporter comprises a navigation assembly and a laser pointing element. The navigation assembly detects a first reflected signal and a second reflected signal when the material transporter moves based on the movement instruction and generates the current displacement data. The laser pointing element generates a laser beam based on the second coordinate when the material transporter arrives the first coordinate. This disclosure is further related to a navigation method.

10 Claims, 7 Drawing Sheets

NAVIGATION SYSTEM FOR MATERIAL STORAGE SYSTEM AND NAVIGATION METHOD FOR MATERIAL TRANSPORTER

CROSS-REFERENCE TO RELATED APPLICATIONS

This non-provisional application claims priority under 35 U.S.C. § 119(a) on Patent Application No(s). 201910506745.8 filed in China on Jun. 12, 2019, the entire contents of which are hereby incorporated by reference.

BACKGROUND

1. Technical Field

This disclosure relates to a navigation system, and more particularly to a navigation system adapted for material storage system.

2. Related Art

Nowadays, many material storage systems use pick-to-light/put-to-light (PTL) system and navigation method based on simultaneous localization and mapping (SLAM) to manage the materials stored in a warehouse, so that staff members can quickly locate the material storage cabinet to place or pick up the materials from the storage cabinet.

PTL system and simultaneous localization and navigation method based on SLAM can although provide a more convenient way of managing the material storage system, however, with the expanding of the warehouse, there also follows the need to expand PTL system as well, which indirectly increases the cost of expanding the warehouse. On the other hand, since the navigation method using SLAM is based on identifying the environment, expanding the warehouse will result in the staff members being inaccurately guided to the desired storage cabinet when using the navigation method based on SLAM.

SUMMARY

According to one or more embodiment of this disclosure, a navigation method for a material transporter is provided, the method applied to a material storage system, the navigation method includes: by a monitoring device, generating an order instruction including a first coordinate and a second coordinate, generating a movement instruction according to the first coordinate and a current coordinate of the material transporter, and transmitting the order instruction and the movement instruction to the material transporter; by the material transporter, moving according to the movement instruction, detecting a first reflected signal and a second reflected signal to calculate an offset, and generating a current displacement data accordingly; determining whether the material transporter arrives at the first coordinate according to the current displacement data by the monitoring device; and when the material transporter arrives at the first coordinate, controlling a laser pointing element to generate a laser beam pointing to a material storage location according to the second coordinate by the monitoring device.

According to one or more embodiment of this disclosure, a navigation system is provided, the system is applied to a material storage system, includes: a monitoring device configured to generate an order instruction including a first coordinate and a second coordinate, and generate a movement instruction according to the first coordinate and a current coordinate; and a material transporter connected to the monitoring device and transmits the current coordinate of the material transporter to the monitoring device, configured to receive the order instruction and the movement instruction from the monitoring device, and generate and transmit an current displacement data to the monitoring device for the monitoring device to determine whether the material transporter arrives at the first coordinate, the material transporter includes: a navigation assembly, disposed at a bottom surface of the material transporter, configured to detect a first reflected signal and a second reflected signal to calculate an offset when the material transporter is moving according to the movement instruction, and accordingly generates the current displacement data; and a laser pointing element, disposed at a surface of the material transporter and controlled by the monitoring device, wherein when the monitoring device determines the material transporter arrives at the first coordinate, the laser pointing element is configured to generate a laser beam pointing to a material storage location according to the second coordinate.

The above description and the below embodiments are used to demonstrate and explain the principles of present disclosure, and to provide a further explanation of the claims of present invention.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
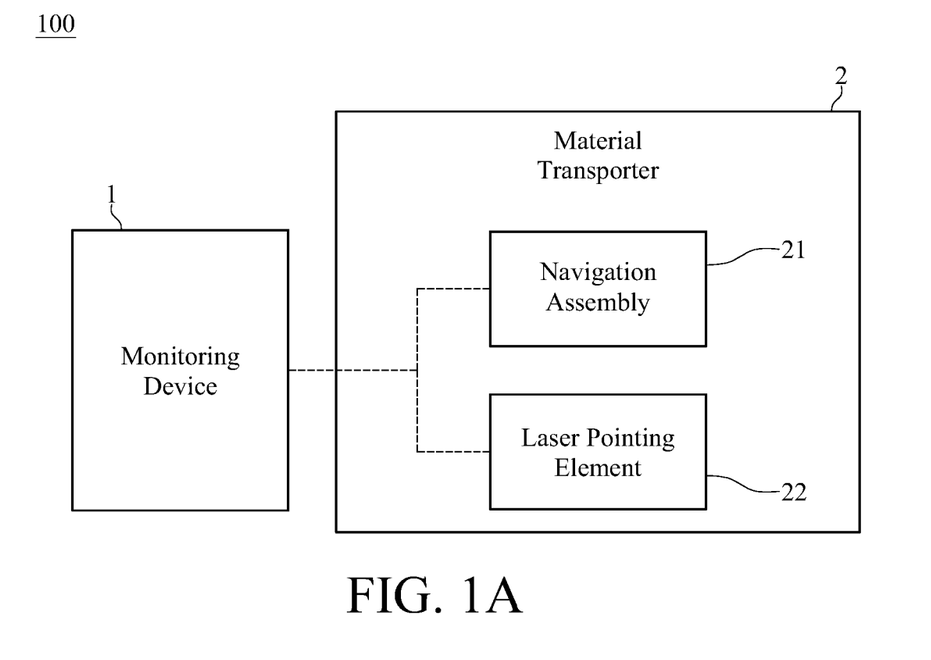
FIG. 1A is a block diagram of a navigation system for material storage system according to one embodiment of the present disclosure.
Figure 1B:
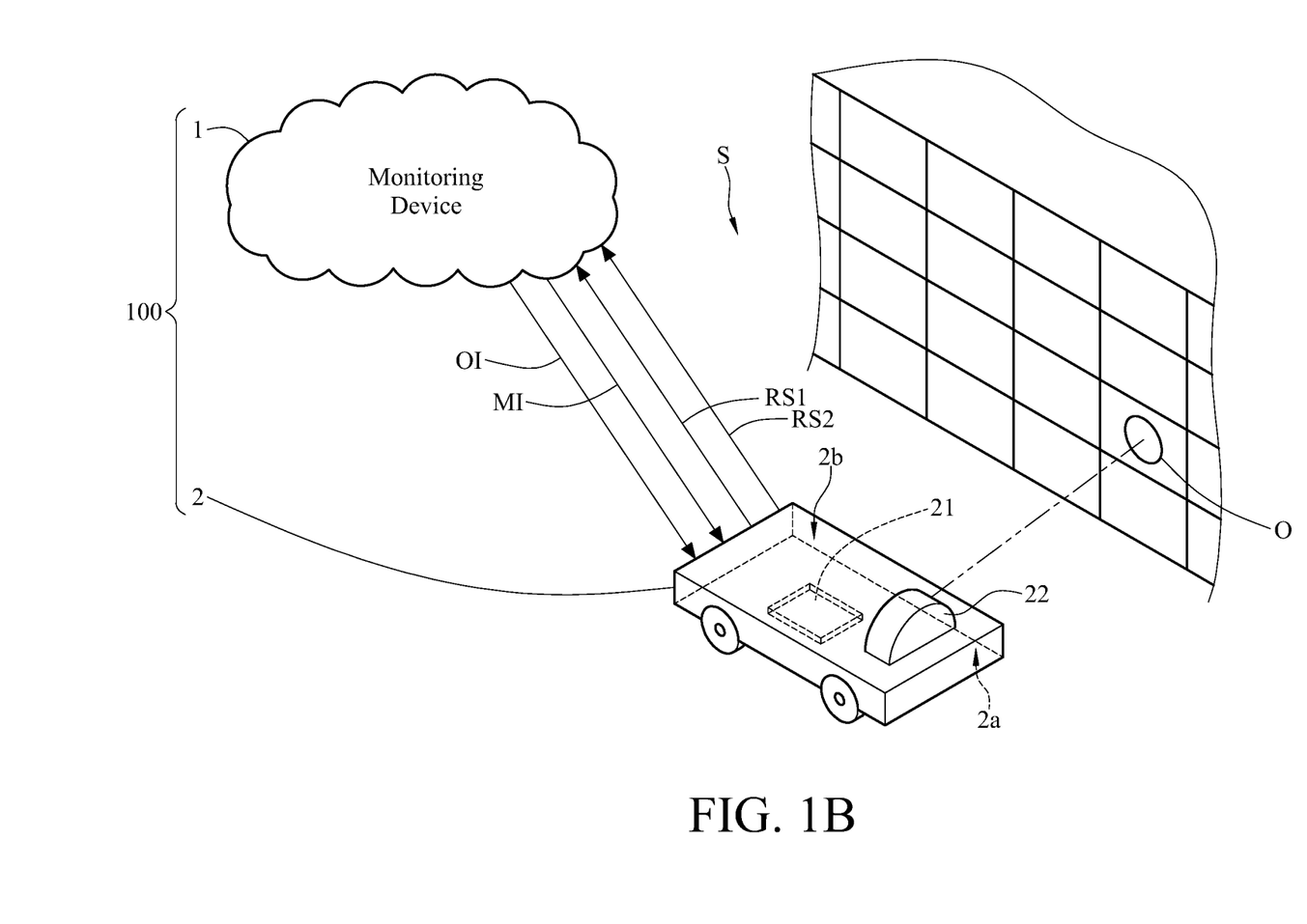
FIG. 1B is a diagram illustrating a scenario of applying a navigation system for material storage system according to one embodiment of the present disclosure.

Please refer to FIGS. 1A and 1B. FIG. 1A is a block diagram of a navigation system 100 for material storage system according to one embodiment of the present disclosure, FIG. 1B is a diagram illustrating a scenario of applying a navigation system 100 for material storage system S according to one embodiment of the present disclosure. The navigation system 100 includes a monitoring device 1 and a material transporter 2, wherein the material transporter 2 has a navigation assembly 21 and a laser pointing element 22.

The monitoring device 1 is configured to generate an order instruction OI including a first coordinate and a second coordinate, and generate a movement instruction MI according to the first coordinate and a current coordinate of the material transporter 2, and transmit the order instruction OI and the movement instruction MI to the material transporter 2. More specifically, the order instruction OI may include a material storage location O (that is, the location of the material to be picked up) and a required quantity, the movement instruction MI is used in instructing the moving of the material transporter 2. On the other hand, the first coordinate may be the coordinate of the storage cabinet where the material storage location O is located in the entire material storage system S (for example, may be represented by a 2 dimensional coordinate). The second coordinate may be the location of the material storage location O in the storage cabinet (for example, may be represented by the shelf's number of the storage cabinet). In one embodiment, the monitoring device 1 may be configured as a host computer, including a central processing unit, microcontroller, or other processing controller, and communication connected to the material transporter 2 through internet or other wireless communication means. In another embodiment, the monitoring device 1 may also be a processing controller disposed on the material transporter 2 (for example, may be a central processing unit, microcontroller or other processing controller) and electrically connected to the material transporter 2. Or the monitoring device 1 may include a plurality of processing controller, separately disposed on the navigation assembly 21 and the laser pointing element 22 of the material transporter 2 and remote assembly.

The material transporter 2 connects to the monitoring device 1, configured to receive the order instruction OI and the movement instruction MI from the monitoring device 1, and generate and transmit the current displacement data to the monitoring device 1. Therefore, the monitoring device 1 can determine whether the material transporter 2 arrives at the first coordinate based on the current displacement data. More specifically, the material transporter 2 may electronically or communication connected to the monitoring device 1, and move within the material storage system S when receiving the order instruction OI and movement instruction MI. In practice, the material transporter 2 can be realized by automated guided vehicle (AGV), it can also be realized by other vehicle with carrying function.

The navigation assembly 21 is disposed at a bottom surface 2a of the material transporter 2, configured to detect a first reflected signal RS1 and a second reflected signal RS2 to calculate an offset when the material transporter 2 is moving according to the movement instruction MI, and generate the current displacement data accordingly. More specifically, the navigation assembly 21 may include a light-emitting element, the light-emitting element emits an optical signal to the ground at a first moment, and the optical signal reflected from the ground is received by the navigation assembly 21 as the first reflected signal RS1. Similarly, the light-emitting element emits an optical signal to the ground at a second moment, and the optical signal reflected from the ground is received by the navigation assembly 21 as the second reflected signal RS2. When the material transporter 2 is moving, there's an offset between the first reflected signal RS1 and the second reflected signal RS2 due to the changing of the trace on the ground. Therefore, the navigation assembly 21 may obtain the current displacement data of the material transporter 2 according to the offset and the time difference between the first moment and the second moment. Further, the current displacement data may include a coordinate and the moving direction of the material transporter 2, wherein the coordinate described above can be obtained through the first coordinate and the offset described previously. In practice, the navigation assembly 21 may include a laser transceiver or other types of optical signal transceiver.

The laser pointing element 22 is disposed at a surface 2b of the material transporter 2 and controlled by the monitoring device 1. When the monitoring device 1 determines the material transporter 2 arrives at the first coordinate, the laser pointing element 22 may generate a laser beam corresponding to the second coordinate pointing to the material storage location O, to present the position of the material storage location O. Furthermore, the laser beam generated by the laser pointing element 22 may present the corresponding required quantity, so that the staff member can pick up or place the material more intuitively. In practice, the laser pointing element 22 may be configured as a laser pen matching with a turntable controlled by the monitoring device 1, or realized by other laser generating element with changeable laser pointing direction.

Figure 2:
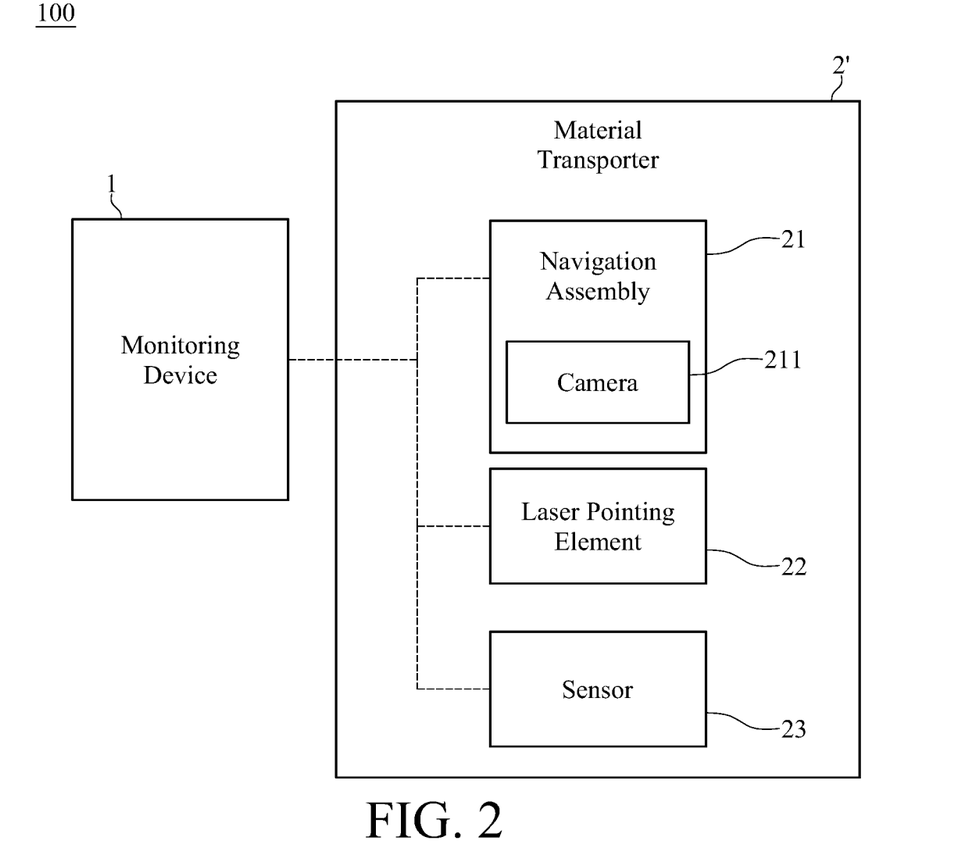
FIG. 2 is a block diagram of a navigation system for material storage system according to another embodiment of the present disclosure.

Please refer to FIG. 2, FIG. 2 is a block diagram of a navigation system 100 for material storage system according to another embodiment of the present disclosure. In this embodiment, the material transporter 2' further includes a sensor 23 comparing to the material transporter 2 presented in FIG. 1A. And the navigation assembly 21 includes a camera 211.

The sensor 23 may be disposed on the material transporter 2' and on the same surface as the laser pointing element 22. The sensor 23 is configured to have the monitoring device 1 revise the required quantity presented by the laser pointing element 22 when being triggered. For example, when the sensor 23 is configured as an image sensor, when the staff member is standing at a position between the material storage location O and the laser pointing element 22, the sensor 23 can detect the required quantity presented at the material storage location O disappears and then be triggered, in turn making the monitoring device 1 revise the required quantity presented by the laser pointing element 22. Therefore, the required quantity can be automatically revised according the staff member's progress at picking and placing material, to improve the efficiency of the progress of picking and placing material. In practice, the sensor 23 may be realized as a laser light sensor, a distance sensor or an audio sensor. The present disclosure is not limited thereto.

When the material transporter 2 is moving according to the movement instruction MI, the camera 211 detects the changes of ground image and generates the first reflected signal RS1 and the second reflected signal RS2, then transmits the first reflected signal RS1 and the second reflected signal RS2 to the monitoring device 1, so that the monitoring device 1 may acquire the current displacement data of the material transporter 2. In another embodiment, a plurality of orientation graphics may be disposed on the ground of the material storage system S. When the monitoring device 1 determines the ground image corresponding to the first reflected signal RS1 or the second reflected signal RS2 includes orientation graphics, the monitoring device 1 calibrates the current displacement data according to the orientation graphics. To be more specific, each orientation graphic separately corresponds to a coordinate and/or a direction. When the material transporter 2 passes through the orientation graphic, the monitoring device 1 may obtain the coordinate and/or direction corresponding to the orientation graphic, and further calibrate the current displacement data of the material transporter 2 according to the obtained coordinate and/or direction, so that the monitoring device 1 can locate the location of the material transporter 2 more accurately.

Figure 3:
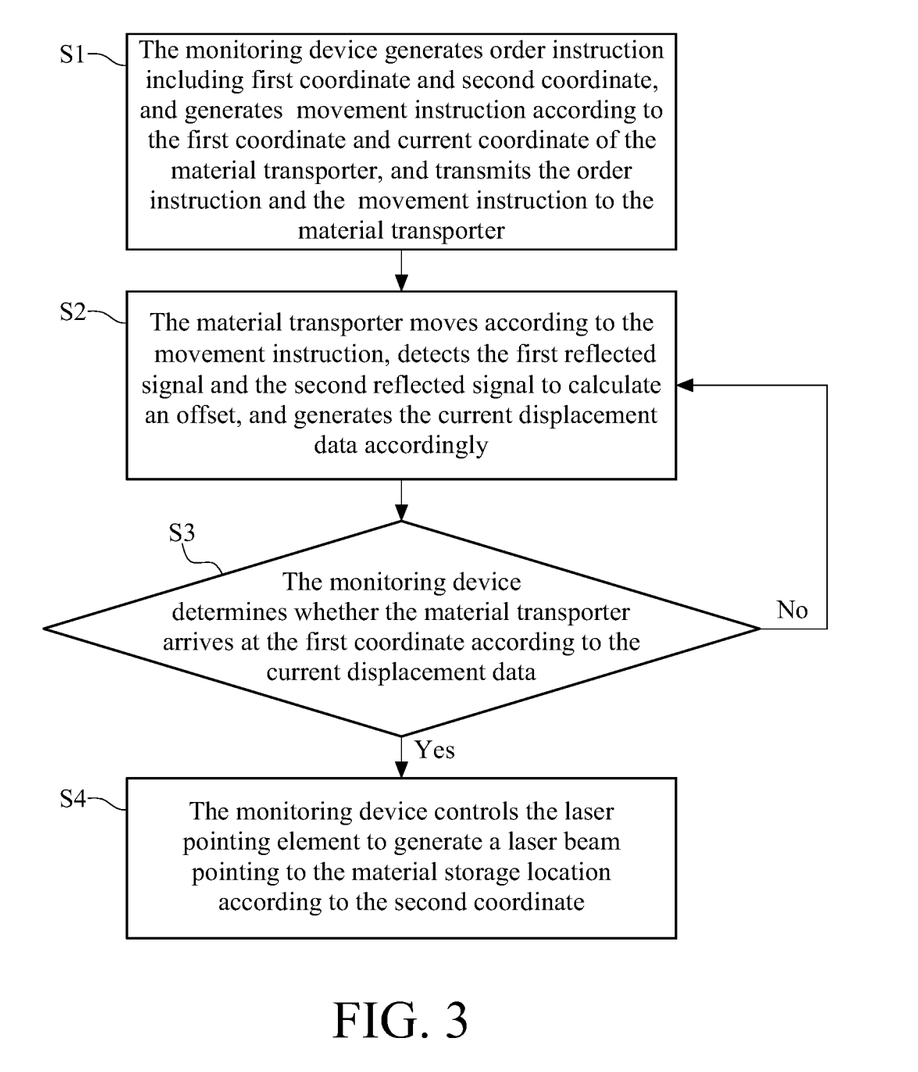
FIG. 3 is a flow chart of a navigation method for a material transporter according to one embodiment of the present disclosure.

Please refer to FIG. 3, and refer to FIG. 1A and FIG. 1B together. FIG. 3 is a flow chart of a navigation method for a material transporter 2 according to one embodiment of the present disclosure. Please refer to step S1: The monitoring device 1 generates order instruction OI including first coordinate and second coordinate, and generates movement instruction MI according the first coordinate and current coordinate of the material transporter 2, and transmits the order instruction OI and the movement instruction MI to the material transporter 2. Specifically, the movement instruction MI relates to a navigation route, the current coordinate is set as an origin of the navigation route, and the first coordinate as the destination, and the navigation route may include a direction parameter relates to a relative location between the current coordinate and the first coordinate. On the other hand, the first coordinate may be a plane coordinate of the material storage location O within the material storage space, the second coordinate may be a vertical coordinate of the material storage location O within the material storage cabinet.

As described above, when the monitoring device 1 transmits the order instruction OI and the movement instruction MI to the material transporter 2, please refer to step S2: The material transporter 2 moves according to the movement instruction MI, detects the first reflected signal RS1 and the second reflected signal RS2 to calculate an offset, and generates the current displacement data accordingly. More specifically, the first reflected signal RS1 and the second reflected signal RS2 are acquired through first emitting optical signals from the navigation assembly 21 to the ground at two different moments, and then obtaining the optical signals reflected by the ground. In another embodiment, the first reflected signal RS1 and the second reflected signal RS2 may be ground images of the trace detected by the material transporter 2 at two different moments. Therefore, according to the two different reflected optical signals or ground images, the monitoring device 1 may be able to calculate the moving direction and distance of the material transporter 2, and to generate the current displacement data.

As described above, when the monitoring device 1 obtains the current displacement data of the material transporter 2, please refer to step S3: The monitoring device 1 determines whether the material transporter 2 arrives at the first coordinate according to the current displacement data; wherein the current displacement data may include the coordinate and moving direction of the material transporter 2. When the material transporter 2 arrives at the first coordinate, please refer to step S4: The monitoring device 1 controls the laser pointing element 22 to generate a laser beam pointing to the material storage location O according to the second coordinate; wherein the second coordinate includes an angle value, and the monitoring device 1 may control the laser pointing element 22 to use the angle value as an elevation angle to point to the material storage location O.

Figure 4:
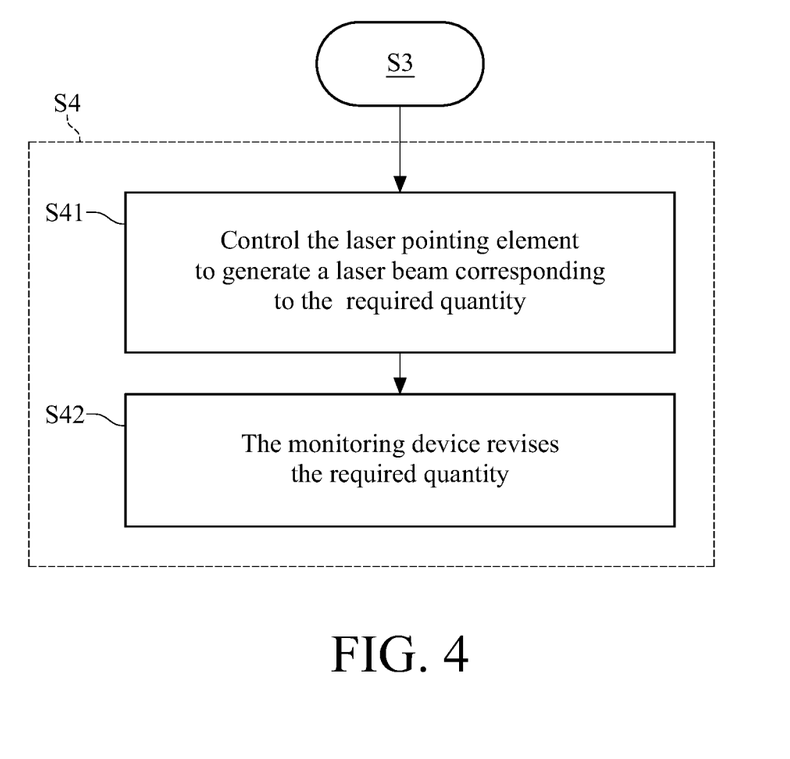
FIG. 4 is a detailed flow chart of a navigation method for a material transporter according to one embodiment of the present disclosure.

Please refer to FIG. 4, and refer to FIG. 2 together. FIG. 4 is a detailed flow chart of applying the navigation method of step S4 shown in FIG. 3 to the material transporter 2' shown in FIG. 2. When the monitoring device 1 controls the laser pointing element 22 to generate a laser beam to point to the material storage location O according to the second coordinate, please refer to step S4: Control the laser pointing element 22 to generate a laser beam corresponding to the required quantity; wherein the required quantity may be presented at the material storage location O by the laser beam. When the laser pointing element 22 generates a laser beam corresponding to the required quantity, and the sensor 23 of the material transporter 2' is triggered, please refer to step S42: The monitoring device 1 revises the required quantity. Generally, when sensor 23 is being triggered once, the required quantity will decrease (or increase) by one unit, so that the staff member can confirm the progress of picking or placing material. Wherein, the trigger mechanism of sensor 23 has been exemplarily described in the preceding embodiments, and will not be described again herein.

Figure 5:
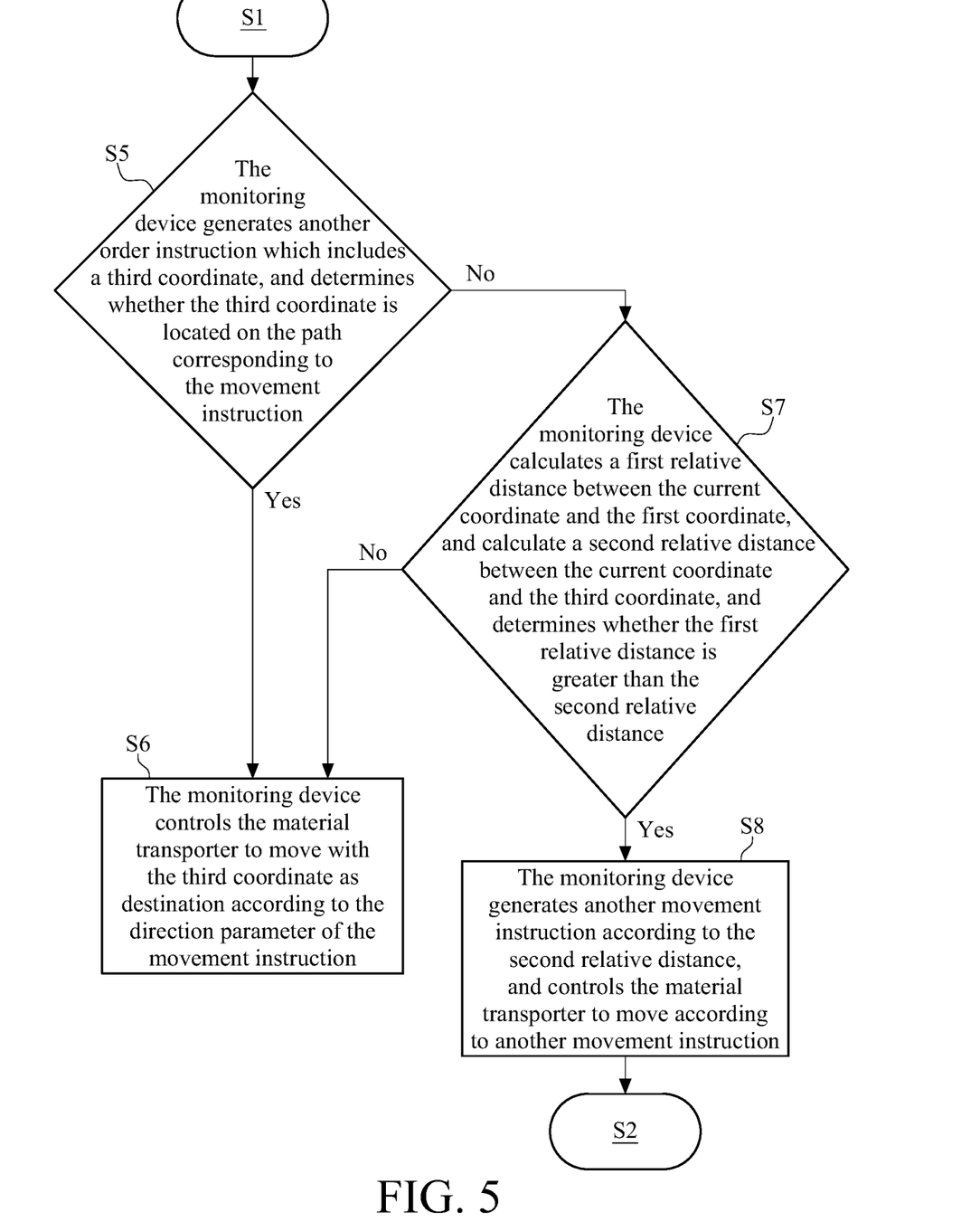
FIG. 5 is a flow chart of a navigation method for a material transporter according to another embodiment of the present disclosure.

Please refer to FIG. 5. FIG. 5 is a flow chart of a navigation method of a material transporter 2 according to another embodiment of the present disclosure. Continued from step S1 in FIG. 3, after the monitoring device 1 transmits the order instruction OI and the movement instruction MI to the material transporter 2, please refer to step S5: The monitoring device 1 generates another order instruction which includes a third coordinate, and determines whether the third coordinate is located on the route corresponding to the movement instruction generated in step S1. Specifically, step S1 describes the situation of the monitoring device 1 inserting an order, and the third coordinate is a material storage location corresponding to another order instruction (the inserted order instruction). When the third coordinate locates on the route, it means that the material storage location corresponding to the another order instruction locates on the original route. Therefore, please refer to step S6: The monitoring device 1 controls the material transporter 2 to move with the third coordinate as destination according to the direction parameter of the original movement instruction.

On the other hand, when the third coordinate is not on the route corresponding to the movement instruction MI generated in step S1, the monitoring device 1 then determines a relative distance between the third coordinate and the current coordinate of the material transporter 2. Please refer to step S7: The monitoring device 1 calculates a first relative distance between the current coordinate and the first coordinate, and calculate a second relative distance between the current coordinate and the third coordinate, and determines whether the first relative distance is greater than the second relative distance. When the first relative distance is not greater than the second relative distance, continue to step S6 described above. On the contrary, when the first relative distance is greater than the second relative distance, continue to step S8: The monitoring device 1 generates another movement instruction according to the second relative distance, and controls the material transporter 2 to move according to another movement instruction, wherein the movement instruction MI generated formerly in step S1 may be executed after the material transporter 2 arrives at the third coordinate. Further, different from the movement instruction MI described previously, the direction parameter included in another movement instruction relates to the relative position between the current coordinate and the third coordinate of the material transporter 2, and the route corresponding to another movement instruction sets the third coordinate as destination. In practice, another movement instruction may be an instant movement instruction or a command of a complete navigation route.

Figure 6:
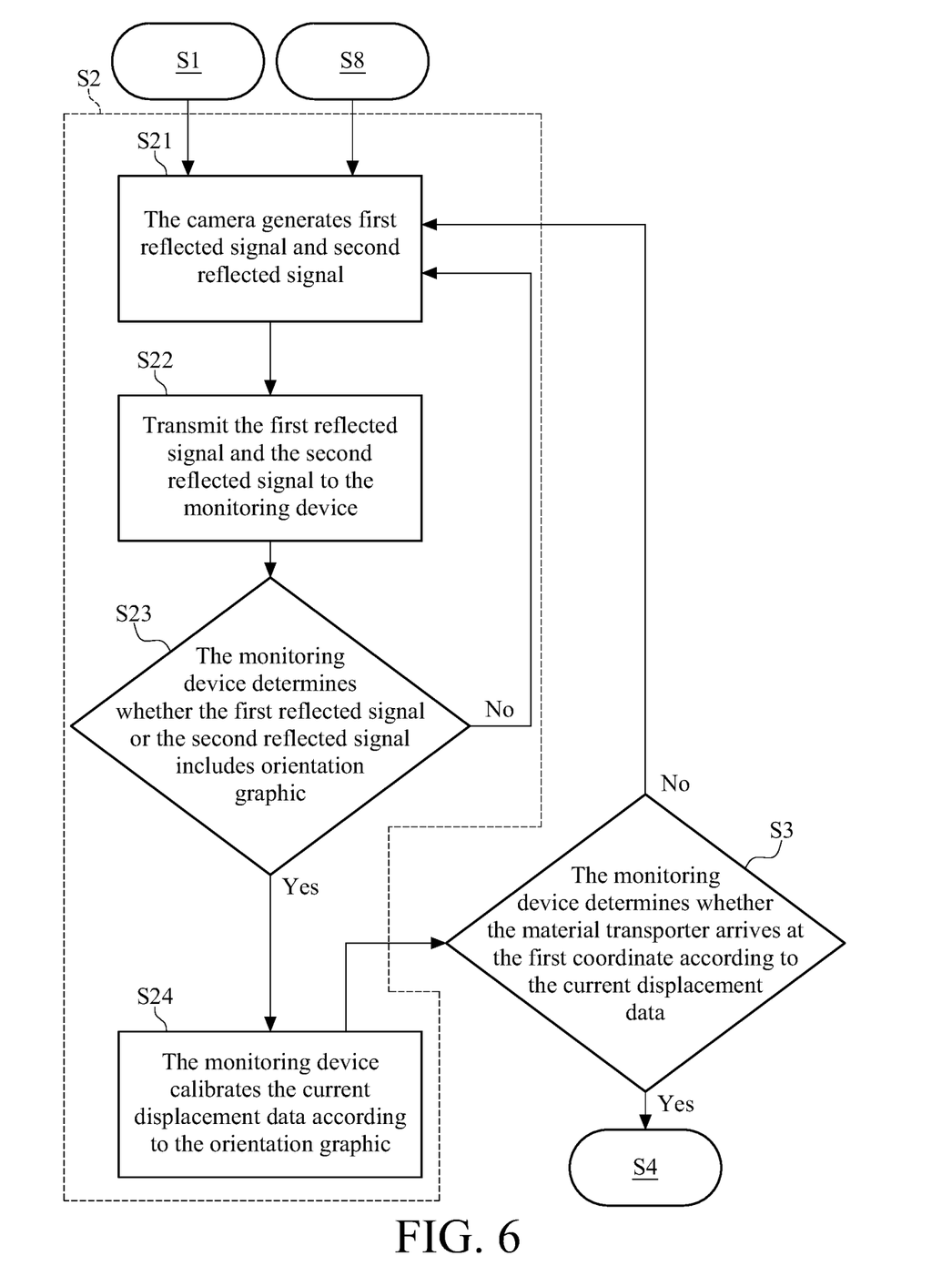
FIG. 6 is a detailed flow chart of a navigation method for a material transporter according to one embodiment of the present disclosure.

Please refer to FIG. 6, and refer to FIG. 2 together. FIG. 6 is a detailed flow chart of applying step S2 of the navigation method shown in FIG. 3 to the material transporter 2' shown in FIG. 2. Continued to step S1 or S8, when the monitoring device 1 moves according to the movement instruction MI or another movement instruction, please refer to step S21: The camera 211 generates first reflected signal and second reflected signal. More specifically, the first reflected signal and the second reflected signal correspond to the changes of the ground trace detected when the material transporter 2' is moving. When the camera 211 generates the first reflected signal and the second reflected signal, please refer to step S22: Transmit the first reflected signal and the second reflected signal to the monitoring device 1, and continue to step S23: The monitoring device 1 determines whether the first reflected signal or the second reflected signal includes orientation graphics. When the first reflected signal or the second reflected signal includes the orientation graphics, please refer to step S24: The monitoring device 1 calibrates the current displacement data according to the orientation graphics; wherein the orientation graphics are disposed at specific locations within the material storage system S and individually corresponds to specific coordinate and/or direction.

More specifically, when the orientation graphic corresponds to coordinate of the specific location in the material storage system S, the monitoring device 1 may confirm the location of the material transporter 2' according to the orientation graphic when passes through the orientation graphic. When the coordinate of the orientation graphic is different from the current displacement data of the material transporter 2', the monitoring device 1 may calibrate the current displacement data of the material transporter 2' according to the coordinate of the orientation graphic. On the other hand, when the orientation graphic corresponds to direction of specific location within the material storage system S, the monitoring device 1 confirms the moving direction of the material transporter 2' according to the image of the orientation graphic as a function of time obtained by the camera 211. When the monitoring device 1 determines the moving direction of the orientation graphic obtained by the camera 211 is different from the current displacement data of the material transporter 2', the monitoring device 1 may calibrate the current displacement data of the material transporter 2' according to the orientation graphic.

In view of the above description, the present disclosure provides a navigation system for material storage system and a navigation method for a material transporter. The described navigation system and the navigation method for the material transporter may guide the material transporter to move to the material storage cabinet, and point to the material storage location in the storage cabinet with a laser beam, and further display the required quantity with the laser beam. Therefore, the navigation method provided by the present disclosure won't generate an error when the configuration of the material storage system varies drastically. The present disclosure can further lower the cost of expanding a factory, provide a more flexible approach in managing a material storage system.

The present disclosure has been disclosed above in the embodiments described above, however it is not intended to limit the present disclosure. It is within the scope of the present disclosure to be modified without deviating from the essence and scope of it. It is intended that the scope of the present disclosure is defined by the following claims and their equivalents.

What is claimed is:

1. A navigation method for a material transporter, applied to a material storage system, wherein the navigation method includes:
    by a monitoring device, generating an order instruction including a first coordinate and a second coordinate, generating a movement instruction according to the first coordinate and a current coordinate of the material transporter, and transmitting the order instruction and the movement instruction to the material transporter;
    by the material transporter, moving according to the movement instruction, detecting a first reflected signal and a second reflected signal to calculate an offset, and generating a current displacement data accordingly;
    determining whether the material transporter arrives at the first coordinate according to the current displacement data by the monitoring device; and
    when the material transporter arrives at the first coordinate, controlling a laser pointing element to generate a laser beam pointing to a material storage location according to the second coordinate by the monitoring device,
    wherein the navigation method further includes:
    by the monitoring device, generating another order instruction including a third coordinate, and determining whether the third coordinate is located on a path corresponding to the movement instruction;
    when the third coordinate is located on the path, controlling the material transporter by the monitoring device to move according to a direction parameter of the movement instruction, and to move with the third coordinate as destination;
    when the third coordinate is not located on the path, by the monitoring device, calculating a first relative distance between the current coordinate and the first coordinate, and calculating a second relative distance between the current coordinate and the third coordinate, and determining whether the first relative distance is greater than the second relative distance;
    when the first relative distance is not greater than the second relative distance, by the monitoring device, controlling the material transporter to move according to the movement instruction; and
    when the first relative distance is greater than the second relative distance, by the monitoring device, generating another movement instruction according to the second relative distance, and controlling the material transporter to move according to the another movement instruction.

2. The navigation method according to claim 1, wherein the order instruction further includes a required quantity for placing/picking-up material, and controlling the laser pointing element according to the second coordinate to generate the laser beam pointing to the material storage location by the monitoring device includes:
    controlling the laser pointing element to generate the laser beam corresponding to the required quantity.

3. The navigation method according to claim 2, further including:
    when a sensor of the material transporter is triggered, revise the required quantity by the monitoring device.

4. The navigation method according to claim 1, wherein the second coordinate includes an angle value, the laser pointing element generates the laser beam pointing to the material storage location according to the angle value.

5. The navigation method according to claim 1, wherein moving according to the movement instruction, detecting the first reflected signal and the second reflected signal to calculate the offset, and generating the current displacement data accordingly include:
by a camera, detecting a change of a ground image to generate the first reflected signal and the second reflected signal; and
transmitting the first reflected signal and the second reflected signal to the monitoring device;
wherein the navigation method further includes:
determining whether the first reflected signal or the second reflected signal includes an orientation graphic by the monitoring device; and
when the first reflected signal or the second reflected signal includes the orientation graphic, calibrating the current displacement data according to the orientation graphic by the monitoring device.

6. A navigation system, applied to a material storage system, including:
a monitoring device configured to generate an order instruction including a first coordinate and a second coordinate, and generate a movement instruction according to the first coordinate and a current coordinate; and
a material transporter connected to the monitoring device and transmits the current coordinate of the material transporter to the monitoring device, configured to receive the order instruction and the movement instruction from the monitoring device, and generate and transmit a current displacement data to the monitoring device for the monitoring device to determine whether the material transporter arrives at the first coordinate, the material transporter includes:
a navigation assembly, disposed at a bottom surface of the material transporter, configured to detect a first reflected signal and a second reflected signal to calculate an offset when the material transporter is moving according to the movement instruction, and generates the current displacement data accordingly; and
a laser pointing element, disposed at a surface of the material transporter and controlled by the monitoring device, wherein when the monitoring device determines the material transporter arrives at the first coordinate, the laser pointing element is configured to generate a laser beam pointing to a material storage location according to the second coordinate, wherein when the monitoring device receives another order instruction including a third coordinate while generating the movement instruction, and determines whether the third coordinate is located on a path, when the monitoring device determines the third coordinate is located on the path, controls the material transporter to move according to the movement instruction, when the monitoring device determines the third coordinate is not located on the path, calculates a first relative distance between the current coordinate and the first coordinate and a second relative distance between the current coordinate and the third coordinate, and determines whether the first relative distance is greater than the second relative distance, wherein when the monitoring device determines the first relative distance is not greater than the second relative distance, controls the material transporter to move according to the movement instruction, when the monitoring device determines the first relative distance is greater than the second relative distance, generates another movement instruction according to the second relative distance, and controls the material transporter to move according to the another movement instruction.

7. The navigation system according to claim 6, wherein the order instruction further includes a required quantity for placing/picking-up material, wherein the laser pointing element is configured to generate the laser beam corresponding to the required quantity.

8. The navigation system according to claim 7, the material transporter further includes a sensor disposed on the surface of the material transporter, wherein the sensor is configured to cause the monitoring device to revise the required quantity when triggered.

9. The navigation system according to claim 6, wherein the second coordinate includes an angle value, the laser pointing element is configured to point to the material storage location according to the angle value when generating the laser beam.

10. The navigation system according to claim 6, wherein the navigation assembly further includes a camera, the camera is configured to generate and transmit the first reflected signal and the second reflected signal to the monitoring device, wherein when the monitoring device determines the first reflected signal or the second reflected signal includes an orientation graphic, calibrates the current displacement data according to the orientation graphic.

* * * * *